United States Patent
Lee et al.

(10) Patent No.: US 9,535,172 B2
(45) Date of Patent: Jan. 3, 2017

(54) METHODS AND APPARATUSES FOR ADAPTIVELY DETERMINING VOLTAGE RESET TIMING

(71) Applicant: Samsung Electronics Co., Ltd., Suwon-Si, Gyeonggi-Do (KR)

(72) Inventors: Kang-Ho Lee, Hwaseong-si (KR); Young Kim, Yongin-si (KR); Jin-Myoung Kim, Hwaseong-si (KR); Jae-chul Park, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/288,818

(22) Filed: May 28, 2014

(65) Prior Publication Data

US 2015/0061735 A1 Mar. 5, 2015

(30) Foreign Application Priority Data

Aug. 27, 2013 (KR) .......................... 10-2013-0102001

(51) Int. Cl.
*G01T 1/24* (2006.01)

(52) U.S. Cl.
CPC ...................................... *G01T 1/24* (2013.01)

(58) Field of Classification Search
CPC ................ G01T 1/00; G01T 1/24; G06F 1/00; G06F 1/24; H03K 3/00; H03K 3/013; H03K 3/0375; H03K 17/00; H03K 17/22; H03K 17/223
USPC .......................................................... 327/198
See application file for complete search history.

(56) References Cited

U.S. PATENT DOCUMENTS

| | | | |
|---|---|---|---|
| 8,350,221 B2 | 1/2013 | Steadman Booker et al. | |
| 8,384,038 B2 | 2/2013 | Guo et al. | |
| 2007/0114427 A1* | 5/2007 | Aoki ....................... | G01T 1/249 |
| | | | 250/370.09 |

FOREIGN PATENT DOCUMENTS

| | | |
|---|---|---|
| JP | 2008-517541 A | 5/2008 |
| KR | 20110018995 A | 2/2011 |
| KR | 10-1092216 B1 | 12/2011 |

OTHER PUBLICATIONS

Gustavsson, Mikael et al. "A High-Rate Energy Resolving Photon-Counting ASIC for Spectral Computed Tomography"; 2012; IEEE Transactions on Nuclear Science, (59), pp. 1-12.

* cited by examiner

*Primary Examiner* — Lincoln Donovan
*Assistant Examiner* — David Mattison (57) ABSTRACT

A voltage reset method may include: acquiring a voltage that is changed with time by using an input photon; determining a timing for resetting the acquired voltage by using time information in a period where the acquired voltage increases; and/or resetting the acquired voltage on a basis of the determined voltage reset timing. A voltage reset apparatus may include: an acquisition unit configured to acquire a voltage that is changed with time by using an input photon; a determination unit configured to determine a timing for resetting the acquired voltage by using time information in a period where the acquired voltage increases; and/or a reset unit configured to reset the acquired voltage on a basis of the determined voltage reset timing.

20 Claims, 6 Drawing Sheets

METHODS AND APPARATUSES FOR ADAPTIVELY DETERMINING VOLTAGE RESET TIMING

CROSS-REFERENCE TO RELATED APPLICATION(S)

This application claims priority from Korean Patent Application No. 10-2013-0102001, filed on Aug. 27, 2013, in the Korean Intellectual Property Office (KIPO), the entire contents of which are incorporated herein by reference.

BACKGROUND

1. Field

Some example embodiments may relate to methods and/or apparatuses for adaptively determining voltage reset timings.

2. Description of Related Art

An X-ray image photographing system, which is medical imaging equipment using radiation, is undergoing a change from an analog type to a digital type. With such a trend, an X-ray detector that may be an element of a digital X-ray system is also undergoing a change. Digital X-ray detection technology may be generally categorized into an indirect method, that may convert X-ray into visible light and then converts the visible light signal into an electrical signal to generate an image, and a direct method, that may convert an X-ray signal into an electrical signal to generate an image.

The indirect method may be categorized into an integrating method, that accumulates a converted electrical signal for a certain time to generate an image signal, and a photon counting detection (PCD) method, that counts the number of X-ray photons to generate an image signal. Here, the PCD method generates an image, that may enable an X-ray energy level to be distinguished, through one-time photographing, and acquires a high-quality image of an object although the object is slightly exposed to X-rays.

Although some example embodiments will be described with relation to a medical imaging system, those skilled in the art will appreciate that some example embodiments may be applied to other types of systems, such as an imaging system not used in the medical field, a more general purpose readout circuit, or a voltage reset apparatus.

SUMMARY

Some example embodiments may provide methods and/or apparatuses for adaptively determining voltage reset timings.

Some example embodiments may provide non-transitory computer-readable storage mediums storing programs for executing the methods in computers.

In some example embodiments, a voltage reset method may comprise: acquiring a voltage that is changed with time by using an input photon; determining a timing for resetting the acquired voltage by using time information in a period where the acquired voltage increases; and/or resetting the acquired voltage on a basis of the determined voltage reset timing.

In some example embodiments, the method may further comprise detecting a change in a voltage value of the acquired voltage by using 'n' different threshold voltage values. The determining may comprise determining the timing for resetting the acquired voltage by using the time information corresponding to the detected change in the voltage value.

In some example embodiments, the determining may further comprise: calculating a first time taken until the acquired voltage increases from a first threshold voltage value to a certain voltage value; and/or calculating a second time taken until the acquired voltage increases from the certain voltage value to a second threshold voltage value. Each of the first and second threshold voltage values may be one of the 'n' different voltage values.

In some example embodiments, the first threshold voltage value may indicate a lowest voltage value of the 'n' different threshold voltage values. The second threshold voltage value may indicate a highest voltage value, which the acquired voltage has, of the 'n' different threshold voltage values.

In some example embodiments, the calculating of the second time may comprise calculating of the second time by combining a first voltage difference between the first threshold voltage value and the certain voltage value, a second voltage difference between the certain voltage value and the second threshold voltage value, and the first time.

In some example embodiments, the calculating of the second time may comprise calculating a ratio of a first voltage difference between the first threshold voltage value and the certain voltage value and a second voltage difference between the certain voltage value and the second threshold voltage value, and calculating of the second time by combining the calculated ratio and the first time.

In some example embodiments, the method may further comprise calculating a certain delay time on a basis of a characteristic of an acquisition unit that acquires the voltage. The determining may further comprise determining the timing for resetting the acquired voltage by using the calculated certain delay time.

In some example embodiments, the characteristic may comprise a characteristic in which a change rate of the voltage is changed per hour by compensating for leakage that occurs when acquiring the voltage.

In some example embodiments, a non-transitory computer-readable storage medium may store a program for executing the method in a computer In some example embodiments, a voltage reset apparatus may comprise: an acquisition unit configured to acquire a voltage that is changed with time by using an input photon; a determination unit configured to determine a timing for resetting the acquired voltage by using time information in a period where the acquired voltage increases; and/or a reset unit configured to reset the acquired voltage on a basis of the determined voltage reset timing.

In some example embodiments, the apparatus may further comprise a comparison unit configured to detect a change in a voltage value of the acquired voltage by using 'n' different threshold voltage values. The determination unit maybe further configured to determine the timing for resetting the acquired voltage by using the time information corresponding to the detected change in the voltage value.

In some example embodiments, the determination unit may be further configured to calculate a first time taken until the acquired voltage increases from a first threshold voltage value to a certain voltage value, and may be further configured to calculate a second time taken until the acquired voltage increases from the certain voltage value to a second threshold voltage value. Each of the first and second threshold voltage values may be one of the 'n' different threshold voltage values.

In some example embodiments, the first threshold voltage value may indicate a lowest voltage value of the 'n' different threshold voltage values. The second threshold voltage value may indicate a highest voltage value, which the acquired voltage has, of the 'n' different threshold voltage values.

In some example embodiments, the determination unit may be further configured to calculate the second time by combining a first voltage difference between the first threshold voltage value and the certain voltage value, a second voltage difference between the certain voltage value and the second threshold voltage value, and the first time.

In some example embodiments, the determination unit may be further configured to calculate a ratio of a first voltage difference between the first threshold voltage value and the certain voltage value and a second voltage difference between the certain voltage value and the second threshold voltage value, and may be further configured to calculate the second time by combining the calculated ratio and the first time.

In some example embodiments, the determination unit may be further configured to calculate a certain delay time on a basis of a characteristic of the acquisition unit, and may be further configured to determine the timing for resetting the acquired voltage by using the calculated certain delay time.

In some example embodiments, the characteristic may comprise a characteristic in which a change rate of the voltage is changed per hour by compensating for leakage that occurs when acquiring the voltage.

In some example embodiments, the apparatus may further comprise a counting unit configured to increase a number of countings by using information included in the detected change in the voltage value. The information included in the detected change in the voltage value may comprise the information that is obtained by the comparison unit determining whether the acquired voltage reaches the 'n' different threshold voltage values.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
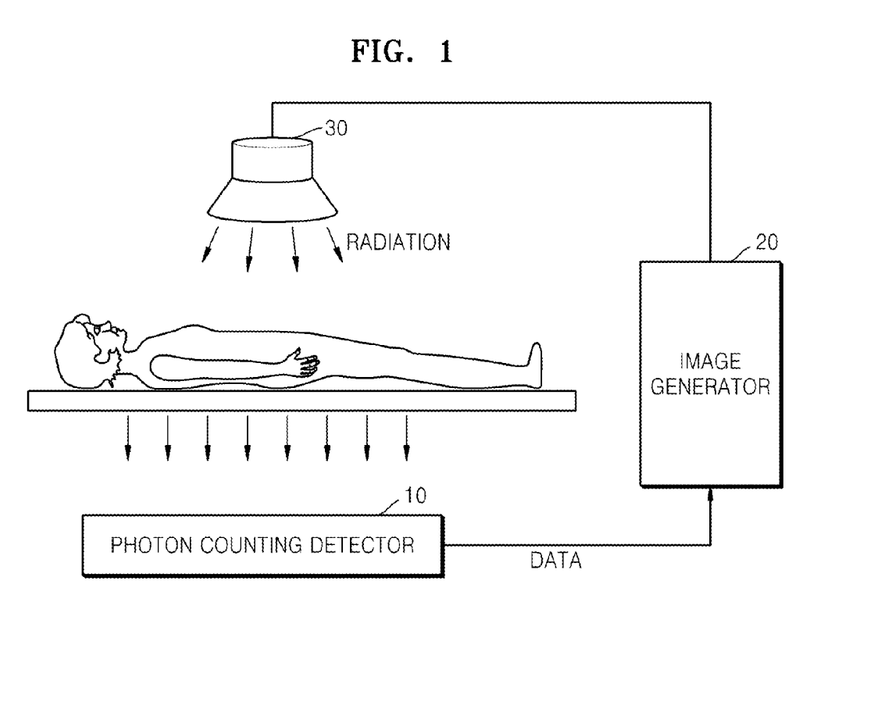
FIG. 1 is a diagram illustrating a configuration of a medical imaging system according to some example embodiments.

FIG. 1 is a diagram illustrating a configuration of a medical imaging system according to some example embodiments.

Referring to FIG. 1, the medical imaging system includes a photon counting detector 10, an image generator 20, and a radiation generator 30. The medical imaging system using radiation detects, by using a sensor, multi-energy radiation that passes through an object such as a human body. The medical imaging system classifies and counts, by energy level, photons included in the multi-energy radiation detected by the sensor, and generates images by energy level of a human body region on the basis of the counted result.

The medical imaging system classifies and counts, by energy level, photons included in multi-energy radiation that passes through an object such as a human body, and generates medical images by energy level by using the counted number of photons by energy level. An amount of radiation absorbed by the object is changed depending on a kind or density of the object with the multi-energy radiation irradiated thereon or an energy level of the radiation.

For example, bones absorb a large amount of X-rays, but muscles absorb a smaller amount of X-rays than that of the bones. Therefore, the number of detected photons when the photons included in radiation generated by the radiation generator 30 pass through a bone differs from the number of detected photons when the radiation passes through a human tissue other than the bone. Also, depending on energy levels of the photons included in the radiation generated by the radiation generator 30, the numbers by energy level of detected photons when the radiation passes through a bone differs from the numbers by energy level of detected photons when the radiation passes through a human tissue other than the bone.

The image generator 20 may generate an X-ray image that enables human tissues to be clearly distinguished, by using a result that is obtained by classifying and counting photons by energy level in the photon counting detector 10.

The radiation generator 30 generates radiation, and irradiates the radiation on an object. The radiation generated by the radiation generator 30 may be various kinds such as ultrasonic waves, alpha rays, beta rays, gamma rays, X-rays, and neutron rays. However, general radiation may denote X-rays that cause ionization to damage a human body. Hereinafter, some example embodiments will be described with X-rays as an example, but technical principles to be described below may be applied to radiation in addition to X-rays.

A pixel region of the photon counting detector 10 corresponds to a photographing region of an object to be photographed by using radiation, and the photon counting detector 10 includes a readout circuit 100 that corresponds to each of a plurality of pixels included in the pixel region. The photon counting detector 10 outputs a counting result, which is obtained from each of a plurality of the readout circuits 100, to the image generator 20. The image generator 20 generates an image of the object by using the counting result.

For example, the readout circuit 100 included in the photon counting detector 10 classifies, by energy level, an electrical signal input from a unit sensor corresponding to the readout circuit 100, and converts the electrical signal into a digital signal to output the digital signal to the image generator 20. The unit sensor corresponds to a certain region of a sensor, and outputs an electrical signal, generated from a detected photon, to the readout circuit 100 of a corresponding readout chip through a unit output terminal. Examples of a method, in which the readout circuit 100 reads out an electrical signal input from the unit sensor, include a charge integration mode and a photon counting mode.

According to some example embodiments, the readout circuit 100 driven in the photon counting mode will be briefly described as follows. First, the readout circuit 100 converts an input photon into a voltage, and compares the converted voltage with an arbitrary threshold voltage value to output digital signals of 1 or 0. The readout circuit 100 counts the number of digital signals of 1 to output digital data including the counted result. According to some example embodiments, the readout circuit 100 to be described below with reference to FIGS. 2 to 8 is the readout circuit 100 using the above-described photon counting mode, and the photon counting detector 10 includes a plurality of the readout circuits 100.

Figure 2:
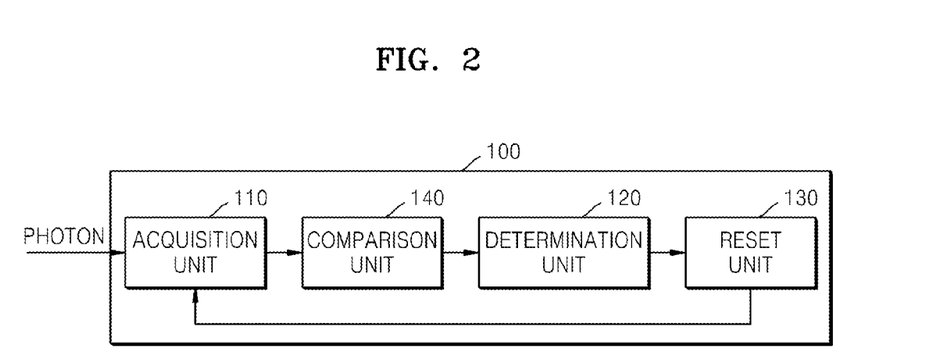
FIG. 2 is a block diagram illustrating an example of a readout circuit according to some example embodiments.
Figure 3:
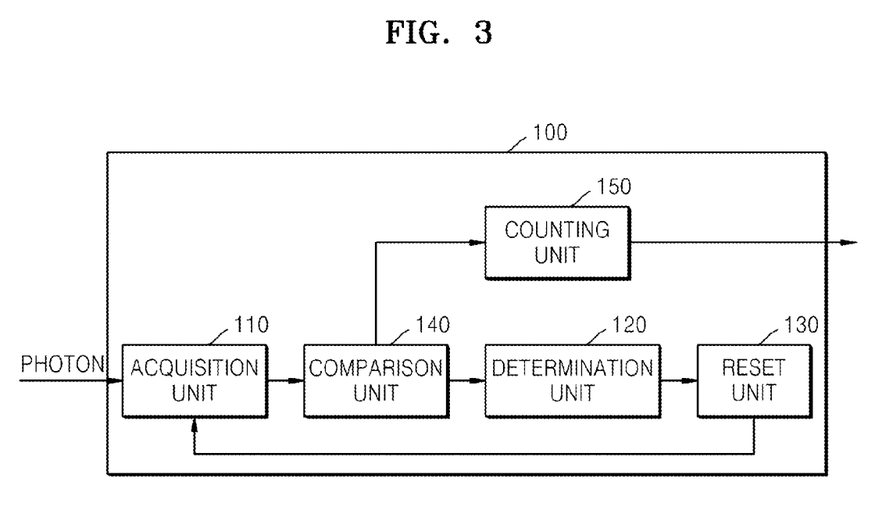
FIG. 3 is a block diagram illustrating another example of a readout circuit according to some example embodiments.
Figure 4:
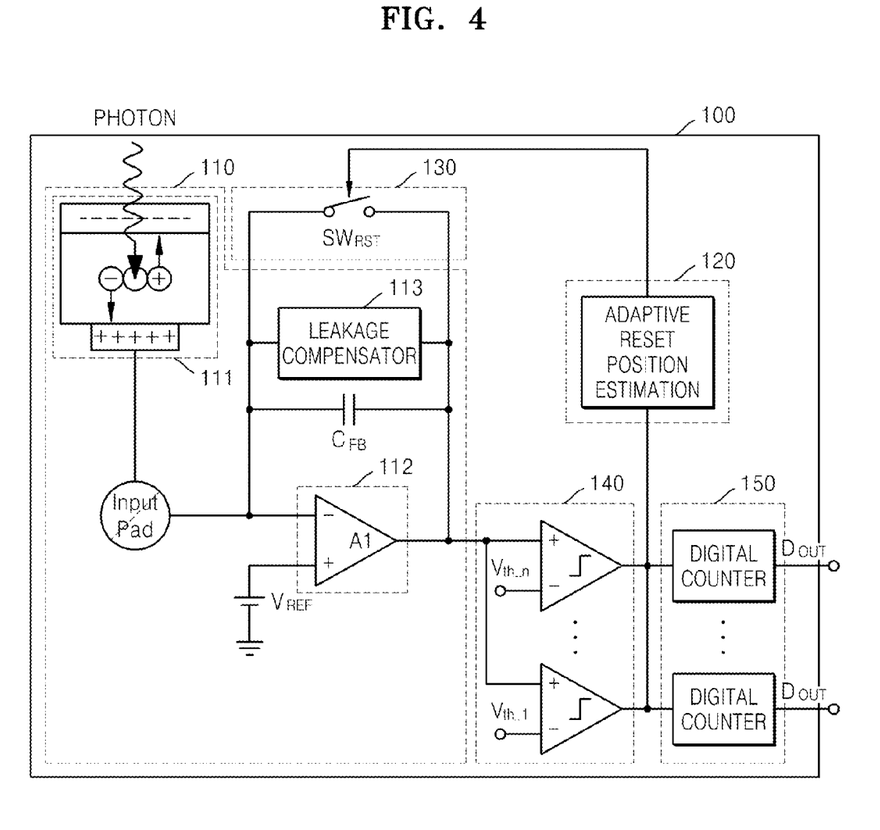
FIG. 4 is a circuit diagram illustrating another example of a readout circuit according to some example embodiments.

In other words, FIGS. 2 to 4 illustrate elements included in one readout circuit 100. In detail, FIGS. 2 to 4 illustrate the readout circuit 100 corresponding to one of a plurality of pixels included in the photon counting detector 10. Therefore, it can be seen that the photon counting detector 10 includes a plurality of readout circuits 100 which operate in the same mode as that of the readout circuit 100 to be described below with reference to FIGS. 2 to 8.

A voltage reset method according to some example embodiments may be performed by the readout circuit 100. For example, the voltage reset method according to some example embodiments may be implemented as a method in which the readout circuit 100 resets a voltage obtained by converting an input photon. According to some example embodiments, a voltage reset method performed by the readout circuit 100 will be described in detail with reference to FIGS. 2 to 8.

FIG. 2 is a block diagram illustrating an example of the readout circuit 100 according to some example embodiments.

Referring to FIG. 2, the readout circuit 100 includes an acquisition unit 110, a comparison unit 140, a determination unit 120, and a reset unit 130. The readout circuit 100 of FIG. 2 is illustrated as including only elements according to some example embodiments. Therefore, it can be understood by those skilled in the art that the readout circuit 100 may further include general-use elements in addition to the elements of FIG. 2.

Moreover, it can be understood by those skilled in the art that each of the acquisition unit 110, comparison unit 140, determination unit 120, and reset unit 130 of the readout circuit 100 of FIG. 2 may be provided as a separate voltage reset apparatus.

The acquisition unit 110 acquires a voltage which is changed with time, by using an input photon. For example, the acquisition unit 110 may include a photoconducting material unit, which converts the input photon into an electrical charge, and a capacitor that converts the converted electrical charge into a voltage. A process in which the acquisition unit 110 acquires a voltage by using a photon will be described below with reference to FIG. 4.

FIG. 4 is a circuit diagram illustrating another example of the readout circuit 100 according to some example embodiments.

Referring to FIG. 4, a circuit referred to by reference numeral 110 may be an example of the acquisition unit 110.

A photon is input to a photoconducting material unit 111 included in the acquisition unit 110. An electrical charge packet is generated from the input photon in the photoconducting material unit 111, and is transferred to an input pad due to a drift effect caused by an internal voltage difference of the photoconducting material unit 111. The transferred electrical charge packet is converted into a voltage by passing though a feedback capacitor $C_{FB}$ of a pre-amplifier 112. According to some example embodiments, a level of the converted voltage is proportional to an amount of electrical charge packet that is generated from the input photon. In detail, the voltage that is generated by passing through the pre-amplifier 112 and the feedback capacitor $C_{FB}$ increases (charges) with respect to a reference voltage $V_{REF}$ of the pre-amplifier 112, and then returns (discharges) to the original amount of voltage.

Referring again to FIG. 2, the determination unit 120 determines a voltage reset timing by using time information in a period where an acquired voltage increases. In detail, the determination unit 120 determines the voltage reset timing by using the time information in the period where the voltage acquired by the acquisition unit 110 increases.

The determination unit 120 may correspond one or more processors. Each of the processors may be implemented as an array of a plurality of logic gates, or may be implemented as a combination of a general-use microprocessor and a memory that stores a program executable by the microprocessor. Also, it can be understood by those skilled in the art that the determination unit 120 may be implemented as another type hardware.

In an X-ray detection circuit using a PCD mode, a voltage acquired by the acquisition unit 110 may be reset after a certain time elapses. In other words, a voltage (i.e., a voltage charged into the feedback capacitor $C_{FB}$) expressing information about one electrical charge packet may return to the original voltage level after the certain time elapses. This is because when electrical charge packets generated in response to continuously input photons are stored in the feedback capacitor $C_{FB}$, a quality of an image generated by the image generator 20 is degraded. Therefore, a time (a dead time) taken in resetting a voltage should be short as much as possible.

The readout circuit 100 according to some example embodiments may use a method that discharges a voltage charged into the feedback capacitor $C_{FB}$ at a high speed by using a switch $SW_{RST}$ connected to the feedback capacitor $C_{FB}$, instead of a method that resets a voltage by using a plurality of resistors which are connected to the feedback capacitor $C_{FB}$ in parallel. In other words, the determination unit 120 determines a time at which the switch $SW_{RST}$ operates, for discharging the voltage charged into the feedback capacitor $C_{FB}$.

Figure 5A:
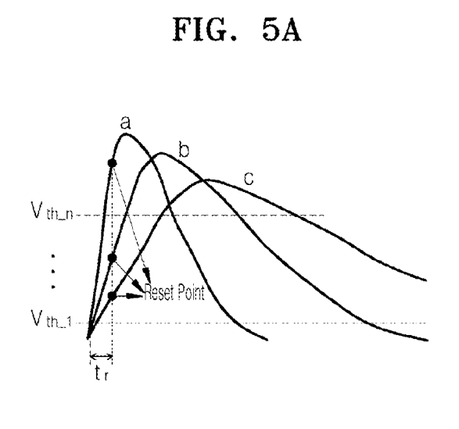
FIGS. 5A and 5B are graphs for describing a voltage reset method according to some example embodiments.
Figure 5B:
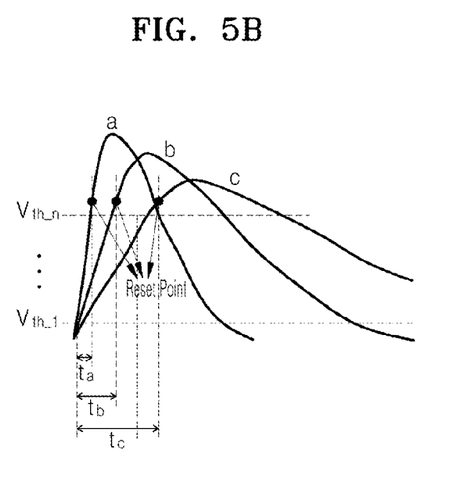

FIGS. 5A and 5B are graphs for describing a voltage reset method according to some example embodiments.

Referring to FIG. 5, three graphs 'a' to 'c' shown in each of FIGS. 5A and 5B are graphs showing voltages which are variously acquired according to a characteristic of an object. Also, FIG. 5A is a diagram showing voltages which are reset with the same time interval tr, and FIG. 5B is a diagram showing an example that adaptively determines a reset timing according to a type of voltage acquired by the determination unit 120 according to some example embodiments.

A voltage graph may be variously shown according to a characteristic of an object. For example, a voltage may be shown as various types of graphs according to a thickness of an object with X-rays irradiated thereon or a density of materials constituting the object.

Referring to FIG. 5A, when a voltage is reset after a certain time tr elapses from a time (i.e., a time at which a photon is input) at which the voltage increases in difference graphs 'a' to 'c', voltage values to which the graphs 'a' to 'c' are reset differ. That is, unlike the graph 'a', in the graphs 'b' and 'c', a voltage is reset in a state where an increased voltage value is not fully reflected. Therefore, an image of an object generated by the image generator 20 cannot fully reflect a thickness of the object or a density of materials constituting the object, causing a degradation in quality of an image.

Referring to FIG. 5B, the determination unit 120 according to some example embodiments adaptively determines a reset timing according to a type of acquired voltage (i.e., a voltage graph). In other words, the determination unit 120 reflects voltage values shown in the graphs 'a' to 'c' and slopes of the graphs 'a' to 'c', and thus determines different voltage reset timing $t_a$, $t_b$, and $t_c$. Therefore, since information about a characteristic (for example, a thickness or a density) of an object is reflected in an image of the object generated by the image generator 20, distortion of image information may be reduced or minimized, and a quality of an image increases. According to some example embodiments, a detailed operation of the comparison unit 140 which is first performed for determining a reset timing of an acquired voltage will be described.

Referring again to FIG. 2, the comparison unit 140 detects a change in a voltage value of an acquired voltage by using 'n' number of different voltage values. In detail, the comparison unit 140 divides a voltage range allowable to a voltage into 'n' number of different voltage values. The comparison unit 140 detects a voltage value from a voltage which is changed with time, by using the divided 'n' voltage values.

Referring again to FIG. 4, a circuit referred to by reference numeral 140 may be an example of the comparison unit 140. The comparison unit 140 may be implemented by parallelly connecting 'n' number of comparators having different threshold voltage values. For example, when it is assumed that the comparators included in the comparison unit 140 have different levels of threshold voltage values $V_{th\_1}, V_{th\_2}, \ldots, V_{th\_n}$, and the maximum level of a voltage acquired by the acquisition unit 110 is greater than the threshold voltage value $V_{th\_n-1}$ and less than the threshold voltage value $V_{th\_n}$, the comparison unit 140 may sequentially output a turn-on result from a comparator having the threshold value $V_{th\_1}$ to a comparator having the threshold voltage value $V_{th\_n-1}$, and a comparator having the threshold voltage value $V_{th\_n}$ may output a turn-off result. In this way, the comparison unit 140 may detect a change in a voltage value of the voltage acquired by the acquisition unit 110.

Figure 6A:
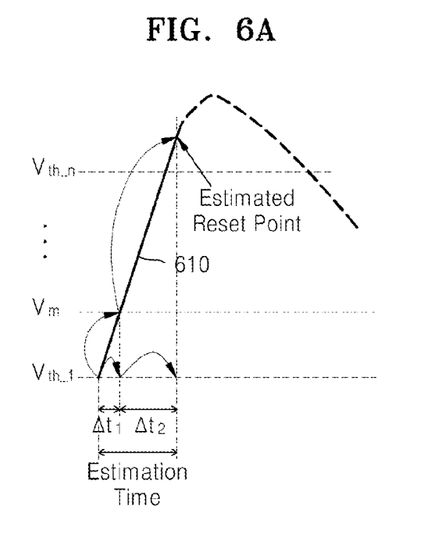
FIGS. 6A and 6B are graphs for describing an operation of a determination unit according to some example embodiments.
Figure 6B:
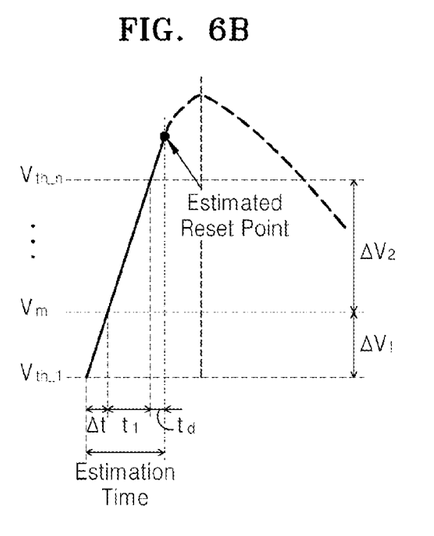

Referring again to FIG. 2, the determination unit 120 determines a voltage reset timing by using information about the detected voltage change. For example, the determination unit 120 determines the voltage reset timing by using time information corresponding to the voltage change detected by the comparison unit 140. According to some example embodiments, a detailed method in which the determination unit 120 determines a voltage reset timing will be described with reference to FIG. 6.

FIGS. 6A and 6B are graphs for describing an operation of the determination unit according to some example embodiments.

Referring to FIG. 6A, a graph 610 showing a voltage acquired by the acquisition unit 110 and 'n' number of different threshold voltage values $V_{th\_1}, \ldots, V_{th\_n}$ divided by the comparison unit 140 are shown. The 'n' different threshold voltage values $V_{th\_1}, \ldots, V_{th\_n}$ are the threshold voltage values of the 'n' comparators included in the comparison unit 140. Also, in FIG. 6A, a voltage value $V_m$ is shown separately from the 'n' different threshold voltage values $V_{th\_1}, \ldots, V_{th\_n}$. According to some example embodiments, it is assumed that the graph 610 showing the voltage acquired by the acquisition unit 110 increases up to a voltage value exceeding the highest threshold voltage value $V_{th\_n}$ of the 'n' different threshold voltage values $V_{th\_1}, \ldots, V_{th\_n}$.

According to the graph 610 of FIG. 6A, the 'n' comparators included in the comparison unit 140 may all output a turn-on result. Therefore, a voltage reset timing "$\Delta t_1 + \Delta t_2$" may be determined after a corresponding voltage increases up to the voltage value exceeding the highest threshold voltage value $V_{th\_n}$. The determination unit 120 calculates a previous time $\Delta t_1$ before and a subsequent time $\Delta t_2$ after the voltage acquired by the acquisition unit 110 reaches the voltage value $V_m$, thereby determining the voltage reset timing "$\Delta t_1 + \Delta t_2$". According to some example embodiments, an operation of the determination unit 120 will be described with reference to FIG. 6B.

Referring to FIG. 6B, the determination unit 120 calculates a first time $\Delta t_1$ taken until an acquired voltage increases from a first threshold voltage value $V_{th\_1}$ to a certain voltage value $V_m$. Also, the determination unit 120 calculates a second time $t_1$ taken until the acquired voltage increases from the certain voltage value $V_m$ to an $n^{th}$ threshold voltage value $V_{th\_n}$. Furthermore, the determination unit 120 adds the calculated first time $\Delta t_1$ and second time $t_1$ to determine a voltage reset timing "$\Delta t_1 + t_1$".

According to some example embodiments, each of the first threshold voltage value $V_{th\_1}$ and $n^{th}$ threshold voltage value $V_{th\_n}$ may denote one of the 'n' different threshold voltage values divided by the comparison unit 140. For example, the first threshold voltage value $V_{th\_1}$ may denote the lowest threshold voltage value of the 'n' different threshold voltage values, and the $n^{th}$ threshold voltage value $V_{th\_n}$ may denote the highest voltage value, which the acquired voltage has, of the 'n' different threshold voltage values.

The certain voltage value $V_m$ is a voltage value which is set separately from the 'n' difference threshold voltage values, and may be implemented by adding a comparator having the certain voltage value $V_m$ to the comparison unit 140. According to some example embodiments, the certain voltage value $V_m$ denotes a certain value included in a voltage level range in which the 'n' different threshold voltage values are shown.

First, the determination unit 120 calculates the first time $\Delta t_1$ taken until the acquired voltage increases from the first threshold voltage value $V_{th\_1}$ to the certain voltage value $V_m$. For example, the determination unit 120 may perform an exclusive-OR (XOR) operation on a result of the comparator having the first threshold voltage value $V_{th\_1}$ and a result of the comparator having the certain voltage value $V_m$ to calculate the first time $\Delta t_1$. The XOR operation performed by the determination unit 120 is merely an example, and all methods of calculating the first threshold voltage value $V_{th\_1}$ may correspond to some example embodiments with no limitation.

Subsequently, the determination unit 120 calculates the second time $t_1$ taken until the acquired voltage increases from the certain voltage value $V_m$ to the $n^{th}$ threshold voltage value $V_{th\_n}$. In detail, the determination unit 120 may combine a first voltage difference $\Delta V_1$ between the first threshold voltage value $V_{th\_1}$ and the certain voltage value $V_m$, a second voltage difference $\Delta V_2$ between the certain voltage value $V_m$ and the $n^{th}$ threshold voltage value $V_{th\_n}$, and the first time $\Delta t_1$ to calculate the second time $t_1$.

It is assumed that a period, in which the voltage acquired by the acquisition unit 110 increases, has a linearity with respect to time. In other words, it is assumed that an increase rate of voltage with time is constant. Therefore, the acquisition unit 110 may calculate the first time $\Delta t_1$, and measure the first voltage difference $\Delta V_1$ and the second voltage difference $\Delta V_2$, thereby calculating the second time $t_1$.

For example, the acquisition unit 110 may calculate the second time $t_1$ with the following Equation (1):

$$t_1 = \Delta t_1 \cdot \frac{V_{th\_n} - V_m}{V_m - V_{th\_1}} \qquad (1)$$

where $\Delta t_1$ denotes the first time, and $V_{th\_n} - V_m$ denotes the second voltage difference $\Delta V_2$. Also, $V_m - V_{th\_1}$ denotes the first voltage difference $\Delta V_1$.

That is, the determination unit 120 may calculate a ratio of the first voltage difference $\Delta V_1$ and the second voltage difference $\Delta V_2$, and combine the calculated ratio and the first time $\Delta t_1$ to calculate the second time $t_1$.

The determination unit 120 may calculate a certain delay time $t_d$ on the basis of a characteristic of the acquisition unit 110, and may determine a voltage reset timing "$\Delta t_1 + t_1 + t_d$" by adding the calculated delay time $t_d$. According to some example embodiments, the characteristic of the acquisition unit 110 denotes a characteristic in which a change rate of voltage is changed per hour in an operation of acquiring the voltage.

As described above, it is assumed that the period, in which the voltage acquired by the acquisition unit 110 increases, has a linearity with respect to time. However, the period may not actually have a linearity with respect to time due to a leakage compensator 113 included in the acquisition unit 110. According to some example embodiments, as illustrated in FIG. 4, the leakage compensator 113 may be connected to the pre-amplifier 112 and the feedback capacitor $C_{FB}$ in parallel.

For example, the leakage compensator 113 compensates for an error of an increase voltage that is acquired due to a dark current generated in the photoconducting material unit or a leakage current of the readout circuit 100. Also, the leakage compensator 113 allows the voltage acquired by the acquisition unit 110 to be again discharged to the reference voltage $V_{REF}$.

In detail, when charging an electrical charge into the feedback capacitor $C_{FB}$ included in the acquisition unit 110, the charged electrical charge is partially offset by an operation of the leakage compensator 113. Therefore, an amount of electrical charge charged into the feedback capacitor $C_{FB}$ cannot be constant with respect to time and, due to this, the period in which the voltage increases cannot have a linearity.

The determination unit 120 calculates the certain delay time $t_d$ in response to that the period in which the voltage increases cannot have a linearity due to the operation of the leakage compensator 113. Furthermore, the acquisition unit 110 may add the calculated delay time $t_d$ and the calculated first time $\Delta t_1$ and second time $t_1$ to determine the voltage reset timing "$\Delta t_1 + t_1 + t_d$".

As described above, the determination unit 120 may reflect information about a characteristic (for example, a thickness or a density) of an object and information about the characteristic (for example, the operation of the leakage compensator 113) of readout circuit 100 to determine a voltage reset timing, thus minimizing distortion of an image generated by the image generator 20 and enabling an image having a high dynamic range to be obtained.

Referring again to FIG. 2, the reset unit 130 resets a voltage on the basis of the determined timing. In detail, the reset unit 130 may reset a voltage at the timing determined by the determination unit 120. According to some example embodiments, as illustrated in FIG. 4, the reset unit 130 may be configured with the switch $SW_{RST}$ that controls a current applied across both ends of the feedback capacitor $C_{FB}$, but is not limited thereto.

FIG. 3 is a block diagram illustrating another example of the readout circuit 100 according to some example embodiments.

Referring to FIG. 3, the readout circuit 100 further includes a counting unit 150 in addition to the acquisition unit 110, the determination unit 120, the comparison unit 140, and the reset unit 130. The readout circuit 100 of FIG. 3 is illustrated as including only elements according to some example embodiments. Therefore, it can be understood by those skilled in the art that the readout circuit 100 may further include general-use elements in addition to the elements of FIG. 3.

Moreover, it can be understood by those skilled in the art that each of the acquisition unit 110, determination unit 120, comparison unit 140, reset unit 130, and counting unit 150 of the readout circuit 100 of FIG. 3 may be provided as a separate voltage reset apparatus.

The acquisition unit 110, determination unit 120, comparison unit 140, and reset unit 130 of FIG. 3 are as described above with reference to FIG. 2 and, thus, their detailed description is not provided.

The counting unit 150 increases the number of countings by using information included in a detected voltage change. According to some example embodiments, the information included in the detected voltage change denotes information which is obtained by the comparison unit 140 determining whether a voltage reaches the 'n' different threshold voltage values.

Referring again to FIG. 4, a circuit referred to by reference numeral 150 may be an example of the counting unit 150. For example, the counting unit 150 may be implemented with a plurality of digital counters which are serially connected to the 'n' different comparators, respectively.

The counting unit 150 receives information about whether a voltage exceeds a threshold voltage value of a corresponding comparator from each of the comparators included in the comparison unit 140. For example, each of the comparators included in the comparison unit 140 transfers a digital signal, which is defined as 1 when a corresponding comparator is turned on or is defined as 0 when the corresponding comparator is turned off, to the counting unit 150. The counting unit 150 may count the number of times 1 is generated, by using the transferred digital signal.

The counting unit 150 transfers data including the counted result to the image generator 20, which generates an image of an object by using the transferred data.

Figure 7:
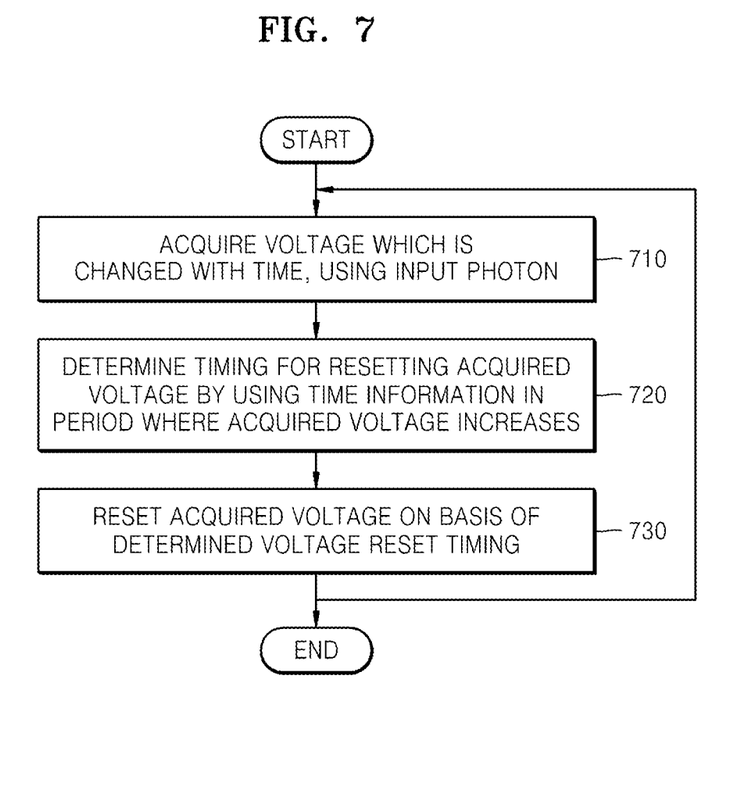
FIG. 7 is a flowchart illustrating an example of a voltage reset method according to some example embodiments.

FIG. 7 is a flowchart illustrating an example of a voltage reset method according to some example embodiments.

Referring to FIG. 7, the voltage reset method includes a plurality of operations that are performed in time series by the medical imaging system or the readout circuit 100 illustrated in FIGS. 1 to 3. Thus, although not described below, the above-described details of the medical imaging system or readout circuit 100 of FIGS. 1 to 3 may be applied to the voltage reset method of FIG. 7.

In operation 710, the acquisition unit 110 acquires a voltage which is changed with time, by using an input photon.

In operation 720, the determination unit 120 determines a timing for resetting the voltage which is acquired in operation 710, by using time information in a period where the acquired voltage increases.

In operation 730, the reset unit 130 resets the voltage which is acquired in operation 710, on the basis of the determined voltage reset timing.

The method of FIG. 7 may be used to reset an acquired voltage in a more general purpose readout circuit or voltage reset apparatus. For example, an acquired voltage may be reset when conducting non-destructive testing of a welded structure in order to more precisely measure flaws in the welds.

Figure 8:
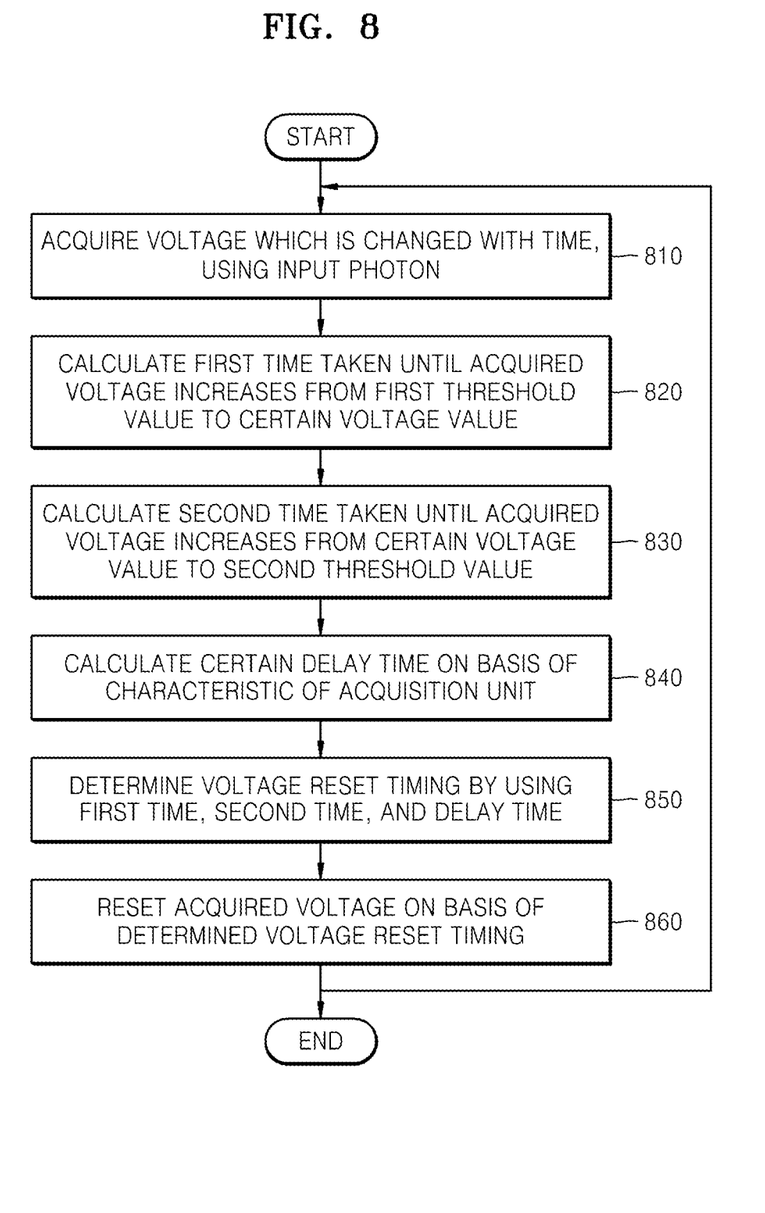
FIG. 8 is a flowchart illustrating another example of a voltage reset method according to some example embodiments.

FIG. 8 is a flowchart illustrating another example of a voltage reset method according to some example embodiments.

Referring to FIG. 8, the voltage reset method includes a plurality of operations that are performed in time series by the medical imaging system or the readout circuit 100 illustrated in FIGS. 1 to 3 and in the flowchart of FIG. 7. Thus, although not described below, the above-described details of the medical imaging system or readout circuit 100 of FIGS. 1 to 3 may be applied to the voltage reset method of FIG. 8.

Moreover, operations 810 and 860 of FIG. 8 respectively correspond to operations 710 and 730 of FIG. 7. Thus, detailed descriptions on operations 810 and 860 are not provided.

In operation 820, the determination unit 120 calculates a first time taken until an acquired voltage increases from a first threshold voltage value to a certain voltage value.

In operation 830, the determination unit 120 calculates a second time taken until the acquired voltage increases from the certain voltage value to an $n^{th}$ threshold voltage value.

In operation 840, the determination unit 120 calculates a certain delay time on the basis of the characteristic of the acquisition unit 110.

In operation 850, the determination unit 120 determines a voltage reset timing by using the calculated results (i.e., the first time, the second time, and the delay time) which are obtained in operations 820 to 840.

The method of FIG. 8 may be used to reset an acquired voltage in a more general purpose readout circuit or voltage reset apparatus. For example, an acquired voltage may be reset when conducting non-destructive testing of a steel beam in order to more precisely measure changes in the internal composition of the beam.

As described above, the readout circuit 100 minimizes a dead time taken in resetting a voltage and, thus counts the number of photons at a high speed. Also, the readout circuit 100 automatically varies a voltage reset timing in response to various characteristics of materials included in an object, thus accurately counting the number of photons.

As described above, according to some example embodiments, a dead time taken in resetting a voltage is shorted as much as possible, and counting the number of photons is performed at a high speed. Also, a voltage reset timing is automatically varied in response to various characteristics of materials included in an object, thus accurately counting the number of photons.

Moreover, X-ray photographing for a broad energy level is performed, and in the Computed Tomography (CT) field and the moving image X-ray field, a lot of images are acquired at a high speed.

The above-described method may be written as computer programs and may be implemented in general-use digital computers that execute the programs using a computer-readable recording medium. Data structure used in the above-described method may be recorded in a computer-readable recording medium by using various methods. Examples of the computer-readable recording medium include magnetic storage media (e.g., ROM (Read-Only Memory), RAM (Random-Access Memory), USB (Universal Serial Bus), floppy disks, hard disks, etc.) and storage media such as optical recording media (e.g., CD-ROMs (Compact Disc-ROM), or DVDs (Digital Video Discs)) and PC (personal computer) interfaces (e.g., PCI (Peripheral Component Interconnect), PCI-express, Wi-Fi, etc.).

In some example embodiments, some of the elements may be implemented as a 'module'. According to some example embodiments, 'module' means software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processors.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

Although some example embodiments have been shown and described, it would be appreciated by those skilled in the art that changes may be made in these example embodiments without departing from the principles and spirit of the example embodiments, the scope of which is defined in the claims and their equivalents. For example, while certain operations have been described as being performed by a given element, those skilled in the art will appreciate that the operations may be divided between elements in various manners.

Additionally, while some example embodiments have been described with relation to a medical imaging system, those skilled in the art will appreciate that some example embodiments may be applied to other types of systems, such as an imaging system not used in the medical field (e.g., radiography of welds in construction or non-destructive testing), or a more general purpose readout circuit or voltage reset apparatus.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A voltage reset method, comprising:
   acquiring a voltage that is changed with time by using an input photon;
   determining a timing for resetting the acquired voltage by using time information, in a period where the acquired voltage increases, and a certain delay time on a basis of a characteristic of a processor that acquires the voltage; and
   resetting the acquired voltage on a basis of the determined voltage reset timing,
   wherein the determining further comprises:
      acquiring a first time taken until the acquired voltage increases from a first threshold voltage value to a certain voltage value;
      acquiring a second time taken until the acquired voltage increases from the certain voltage value to a second threshold voltage value;
      determining the certain delay time on the basis of the characteristic of the processor that acquires the voltage; and
      determining the timing for resetting the acquired voltage by summing the first time, the second time, and the certain delay time.

2. The method of claim 1, further comprising:
   detecting a change in a voltage value of the acquired voltage by using a number of different threshold voltage values;
   wherein the determining further comprises determining the timing for resetting the acquired voltage by using the time information corresponding to the detected change in the voltage value.

3. The method of claim 2, wherein each of the first and second threshold voltage values is one of the number of different voltage values.

4. The method of claim 2, wherein the first threshold voltage value indicates a lowest voltage value of the number of different threshold voltage values, and wherein the second threshold voltage value indicates a highest voltage value, which the acquired voltage has, of the number of different threshold voltage values.

5. The method of claim 1, wherein the acquiring of the second time comprises acquiring of the second time by combining a first voltage difference between the first threshold voltage value and the certain voltage value, a second voltage difference between the certain voltage value and the second threshold voltage value, and the first time.

6. The method of claim 1, wherein the acquiring of the second time comprises:
calculating a ratio of a first voltage difference between the first threshold voltage value and the certain voltage value to a second voltage difference between the certain voltage value and the second threshold voltage value; and
acquiring of the second time by combining the calculated ratio and the first time.

7. The method of claim 1, wherein the determining of the timing for resetting the acquired voltage comprises adding the certain delay time to at least one other time in the time information.

8. The method of claim 1, wherein the characteristic of the processor that acquires the voltage comprises a characteristic in which a change rate of the voltage is changed per hour by compensating for leakage that occurs when acquiring the voltage.

9. A voltage reset apparatus, comprising:
a memory configured to store instructions; and
a processor configured to execute the stored instructions to:
configured to acquire a voltage that is changed with time by using an input photon;
determine a timing for resetting the acquired voltage by using time information, in a period where the acquired voltage increases and a certain delay time on a basis of a characteristic of the processor that acquires the voltage; and
reset the acquired voltage on a basis of the determined voltage reset timing,
wherein the processor is further configured to:
acquire a first time taken until the acquired voltage increases from a first threshold voltage value to a certain voltage value,
acquire a second time taken until the acquired voltage increases from the certain voltage value to a second threshold voltage value,
determine the certain delay time on the basis of the characteristic of the processor, and
determine the timing for resetting the acquired voltage by summing the first time, the second time and the certain delay time.

10. The apparatus of claim 9, wherein the processor is further configured to:
a detect a change in a voltage value of the acquired voltage by using a number of different threshold voltage values; and
determine the timing for resetting the acquired voltage by using the time information corresponding to the detected change in the voltage value.

11. The apparatus of claim 10, wherein each of the first and second threshold voltage values is one of the number of different threshold voltage values.

12. The apparatus of claim 10, wherein the first threshold voltage value indicates a lowest voltage value of the number of different threshold voltage values, and
wherein the second threshold voltage value indicates a highest voltage value, which the acquired voltage has, of the number of different threshold voltage values.

13. The apparatus of claim 9, wherein the processor is further configured to acquire the second time by combining a first voltage difference between the first threshold voltage value and the certain voltage value, a second voltage difference between the certain voltage value and the second threshold voltage value, and the first time.

14. The apparatus of claim 9, wherein the processor is further configured to:
calculate a ratio of a first voltage difference between the first threshold voltage value and the certain voltage value to a second voltage difference between the certain voltage value and the second threshold voltage value, and
acquire the second time by combining the calculated ratio and the first time.

15. The apparatus of claim 9, wherein the processor is further configured to determine the timing for resetting the acquired voltage by adding the certain delay time to at least one other time in the time information.

16. The apparatus of claim 9, wherein the characteristic of the processor comprises a characteristic in which a change rate of the voltage is changed per hour by compensating for leakage that occurs when acquiring the voltage.

17. The apparatus of claim 10, wherein the processor is further configured to:
increase a number of countings by using information included in the detected change in the voltage value;
wherein the information included in the detected change in the voltage value comprises information that is obtained by the processor determining whether the acquired voltage reaches the number of different threshold voltage values.

18. A non-transitory computer-readable storage medium storing program code that, when executed by at least one processor, causes a system to:
acquire a voltage that is changed with time by using an input photon;
determine a timing for resetting the acquired voltage by using time information, in a period where the acquired voltage increases, and a certain delay time on a basis of a characteristic of the at least one processor that acquires the voltage; and
reset the acquired voltage on a basis of the determined voltage reset timing,
wherein the program code that when executed by the at least one processor, causes the system to determine the timing further comprises program code that, when executed by the at least one processor, causes the system to:
acquire a first time taken until the acquired voltage increases from a first threshold voltage value to a certain voltage value;
acquire a second time taken until the acquired voltage increases from the certain voltage value to a second threshold voltage value; and
determine the certain delay time on the basis of the characteristic of the at least one processor that acquires the voltage; and
determine the timing for resetting the acquired voltage by summing the first time, the second time and the certain delay time.

19. The non-transitory computer-readable storage medium of claim 18, further comprising program code that, when executed by the at least one processor, causes the system to:
  detect a change in a voltage value of the acquired voltage by using a number of different threshold voltage values,
  wherein the program code that, when executed by the at least one processor, causes the system to determine the timing comprises program code that, when executed by the at least one processor, causes the system to determine the timing for resetting the acquired voltage by using the time information corresponding to the detected change in the voltage value.

20. The non-transitory computer-readable storage medium of claim 19, wherein each of the first and second threshold voltage values is one of the number of different voltage values.

\* \* \* \* \*